UNITED STATES PATENT OFFICE.

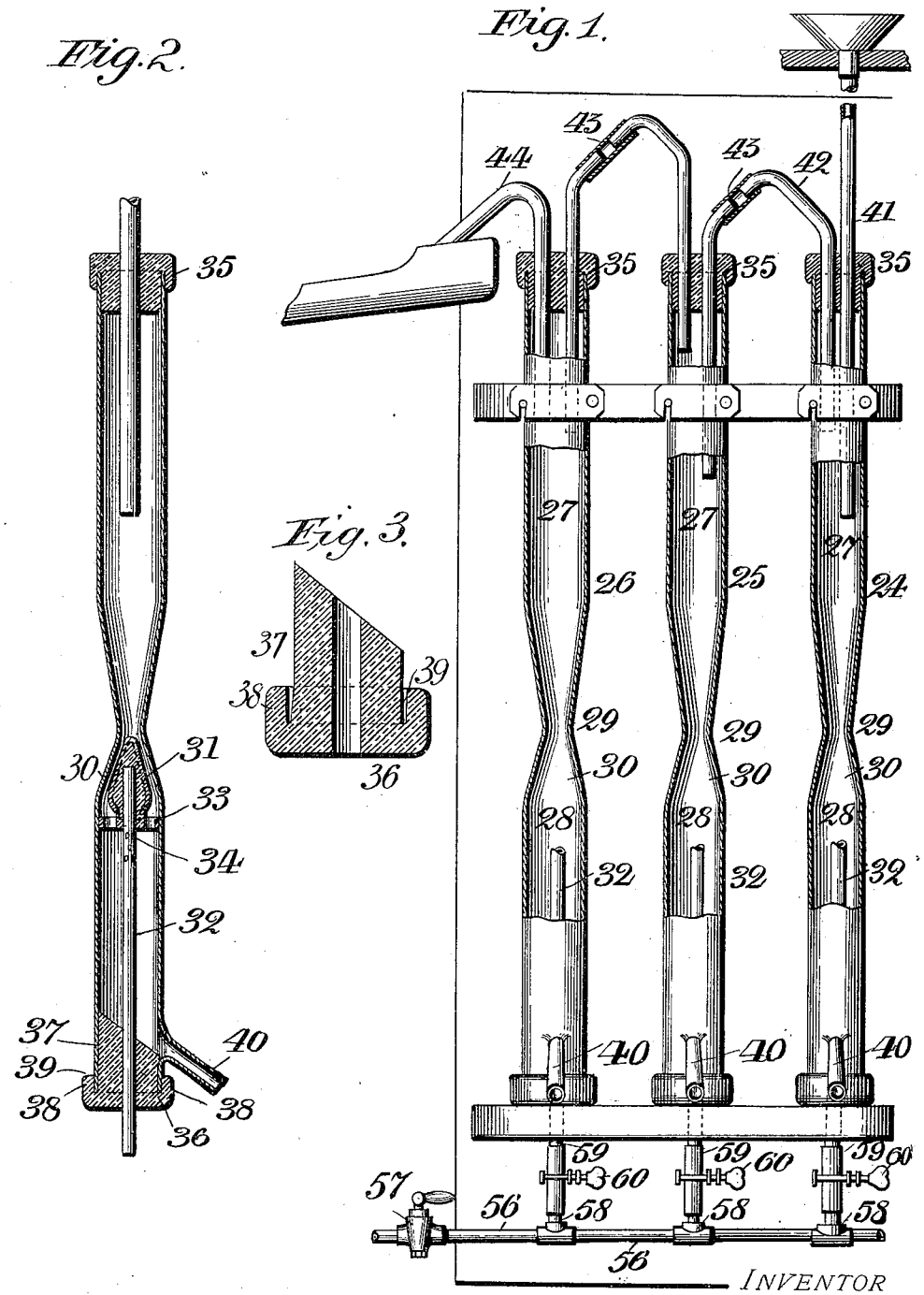

THOMAS ROWLAND JORDAN, OF NEW YORK, N. Y., ASSIGNOR TO THE JORDAN GRAVITATION PROCESS COMPANY, OF NEW YORK.

CONCENTRATING APPARATUS.

SPECIFICATION forming part of Letters Patent No. 661,997, dated November 20, 1900.

Application filed June 8, 1900. Serial No. 19,579. (No model.)

*To all whom it may concern:*

Be it known that I, THOMAS ROWLAND JORDAN, a subject of the Queen of Great Britain, residing at 325 Amsterdam avenue, New York, in the county of New York and State of New York, have invented certain new and useful Improvements in Concentrating Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention is directed to the concentration of minerals and other bodies containing material capable of forming concentrates, the object of the improvement being the provision of a comparatively simple and inexpensive appliance by the employment of which the gangue or waste material is rapidly driven off and concentration of the valuable material effected in a highly efficient and expeditious manner.

Generally speaking, my invention contemplates the provision of concentrating-tubes of novel construction adapted to be connected in a manner to secure control of the passage of the material in suspension therethrough to vary the concentrating effects of the water-currents required by the different specific gravity of the materials contained in the bodies under treatment.

The invention in all of its details is hereinafter described with reference to the accompanying drawings, in which—

Figure is an elevation, partly in section, of a series of concentrating-tubes embodying my invention. Fig. 2 is a sectional view of one of the tubes. Fig. 3 is an enlarged sectional view of one of the tube-stoppers.

Referring to the drawings, it will be noted that the three tubes 24 25 26, which number I preferably employ, are of similar construction with the exception of the upper sections, which provide upper chambers 27 of preferably different diameters. Each tube has a lower chamber 28 and a restricted passage 29 between the chambers. The tube between the upper and lower chamber portions and the restricted connecting-passage 29 is of tapering form, whereby no shoulders or abutments are presented to the water and material to retard its flow, and the tapering connection between said passage and the lower chamber in addition provides a conical seat 30 for a conical regulating-valve 31, the function of which is to control the area of the passage for the water-current. The water is admitted to the tube at the lower end of the lower chamber through a tube 32, which is connected with the water-supply. The valve 31 is mounted on the upper end of the tube 32, and the concentric position of the valve is maintained by a spider 33 or equivalent device, which may be made to slide over tube 32 or made integrally with the valve. Openings 34 in the tube 32 below its connection with the valve afford outlets for the water which rises past the valve into the upper chamber, or said openings may be formed in the lower portion of the valve. Adjustment of the valve is effected by raising or lowering the tube 32. The tubes 24, 25, and 26 are each formed with open ends, and corks or stoppers 35 36 are employed to close the upper and lower ends, respectively, and to afford mountings for the tube connections. Each of the stoppers, which are preferably of rubber or its equivalent, is provided with a plug portion 37, fitting closely the inner side of the tube end, and a flange 38, fitting closely the outer side of said end, whereby the tube is made absolutely water-tight and the stoppers are firmly held in place by internal and external pressure. The plug portion 37 preferably has a depth in excess of that of the outer flange, and the annular groove or recess 39 between the plug and flange which receives the end of the tube preferably tapers toward its base to exert a wedging action on the tube. The stoppers 36 for the lower end of each of the tubes are centrally apertured to receive the water-supply tube 32, and the upper side of the plug portion 37 of this stopper is beveled to direct the concentrates to one side of the tube, where there is provided an outlet 40. The stopper 35 for the upper end of tube 24 is apertured to receive a tube 41, which supplies the material, and a siphon-tube 42, which conveys the material in solution to the next tube. The tube 41 is connected in practice with the material-supplier, and the material, with a quantity of water, is fed through this tube into the lower end of the upper chamber 27, where it meets with the rising-water current delivered through the tube 32, the separation of the heavier from the lighter particles and gangue taking place at and below the restricted passage 29. The siphon-tube 42 is preferably formed in sections, which are connected by a rubber or other flexible coupling-tube 43. Such construction facilitates raising and lowering of the siphon-tube to vary the siphon action to suit different materials. A siphon-tube 44, carried by the tube 26, constitutes the discharge-outlet from the apparatus of the gangue or waste material. The upper chamber 27 of the tube 25 is of larger diameter than the corresponding chamber of the first tube 24, and the upper chamber of the third or last tube 26 is further increased in diameter, the enlargement being proportioned to the increased volume of water passing therethrough, thus equalizing the velocity of the upward current in the upper chambers.

In Fig. 1 is shown an arrangement of piping for feeding water to the tubes. A water-supply pipe 56, which is connected with a water source, is provided with a controlling-valve 57, and leading from the pipe are branch pipes or tips 58, corresponding in number and position to the concentrating-tubes which are positioned above. 59 59 denote rubber or other tubes or pipes, which afford couplings between the tips 58 and the tubes, necks, or other devices provided at the water-inlets to the lower chambers. Each of the tubes 59 has a regulating-valve 60, which, in case the tube is of rubber, is of the clip type, the regulation being effected by compressing the tube.

In operation water in controllable quantity is admitted to the lower chambers and the material is supplied to the first tube through the inlet. The material entering the upper chamber is subjected to the action of the rising water, which being under proper pressure operates to overcome the specific gravity of all but the heaviest particles of the material, the lighter particles, with the gangue or waste material, being carried with the water through the siphon-tube into the second tube. One of the functions of this siphon-tube is to exert a suction action on the water and material in suspension, and thus induce a more or less rapid circulation and expedite the separation of the heavier particles. The provision of adjustment of the siphon connection is made to control the suction action on materials the particles of which vary in specific gravity, the provision above described enabling the degree of adjustment to be accurately and quickly performed, so that attendance and skill incident to the proper operation is the minimum. The heaviest particles collect in the lower chamber of the first tube, while the lighter particles and gangue pass through the siphon-tube into the second tube. The pressure of the water column in the second tube is preferably of less degree than the column in the first tube, the result being that in this second tube the lighter particles are separated and collected, the lightest particles, with the gangue, passing into the third tube. In this third tube the degree of pressure of the water column is preferably further reduced, whereby the suction action and water-pressure operate to separate the finest particles and to carry off through the discharge siphon-tube the gangue free from the precious material. A further function of the siphon-tubes is to induce the passage of the material with the water in circulation, and thereby prevent accumulations in the portion of the tubes where concentration takes place. The suction action of the siphon-tubes tends to produce agitation of the particles of material, and thus preserve proper division thereof. The concentrates may be withdrawn continuously from the lower chambers through the outlet-openings.

I claim as my invention—

1. A concentrating-tube having an upper cylindrical chamber and a lower cylindrical chamber of uniform diameter throughout, said chambers being connected by a restricted passage the walls of which gradually taper, a conical valve-seat at the restricted passage, a conical valve having a vertically-presented apex, means for adjusting said valve to or from said seat to control the area of water-current, an inlet for water below the valve, and an inlet for material and an outlet for gangue in the upper chamber.

2. In a concentrating-tube, a chamber receiving concentrates having a discharge-opening, and a closure for the tube provided with a plug portion entering the chamber to the level of the discharge-opening and beveled throughout upward from said discharge-opening to direct the concentrates thereto.

3. In combination with a concentrating-tube having a plain cylindrical end, a closure for said end having an annular groove of wedge form in cross-section receiving the tube end whereby an inner and an outer wedge-joint is obtained.

4. In a concentrating apparatus, a plurality of tubes having inlets toward their lower end for water in controllable quantity; one of the tubes having an inlet for material, and adjustable siphon connections affording passages between the tubes, each siphon connection being in sections which are flexibly connected thereby permitting ready adjustment.

5. In a concentrating apparatus, a plurality of tubes having inlets toward their lower end for water in controllable quantity, one of the tubes having an inlet for material, adjustable siphon connections affording passages between the upper portions of the tubes, a valved water-supply pipe, and a valved branch pipe leading from the supply-pipe to each inlet.

6. In a concentrating apparatus, a series of tubes having upper and lower chambers connected by restricted tube portions the upper chambers increasing in diameter from the first to the last tube of the series, inlets at the lower chambers for water in controllable quantity, an inlet for material at the upper chamber of the first tube, adjustable siphon connections between the tubes, and an outlet for material in the last tube.

In testimony whereof I affix my signature in presence of two witnesses.

THOMAS ROWLAND JORDAN.

Witnesses:
WM. A. TOPPING,
EDW. F. A. VAUGHAN.